May 22, 1962 V. HECHLER IV, ET AL 3,035,550
FLUID MOTOR
Filed April 25, 1960 4 Sheets-Sheet 1

INVENTORS:
VALENTINE HECHLER, IV
JEROME WEINBERG
BY
ATT'Y

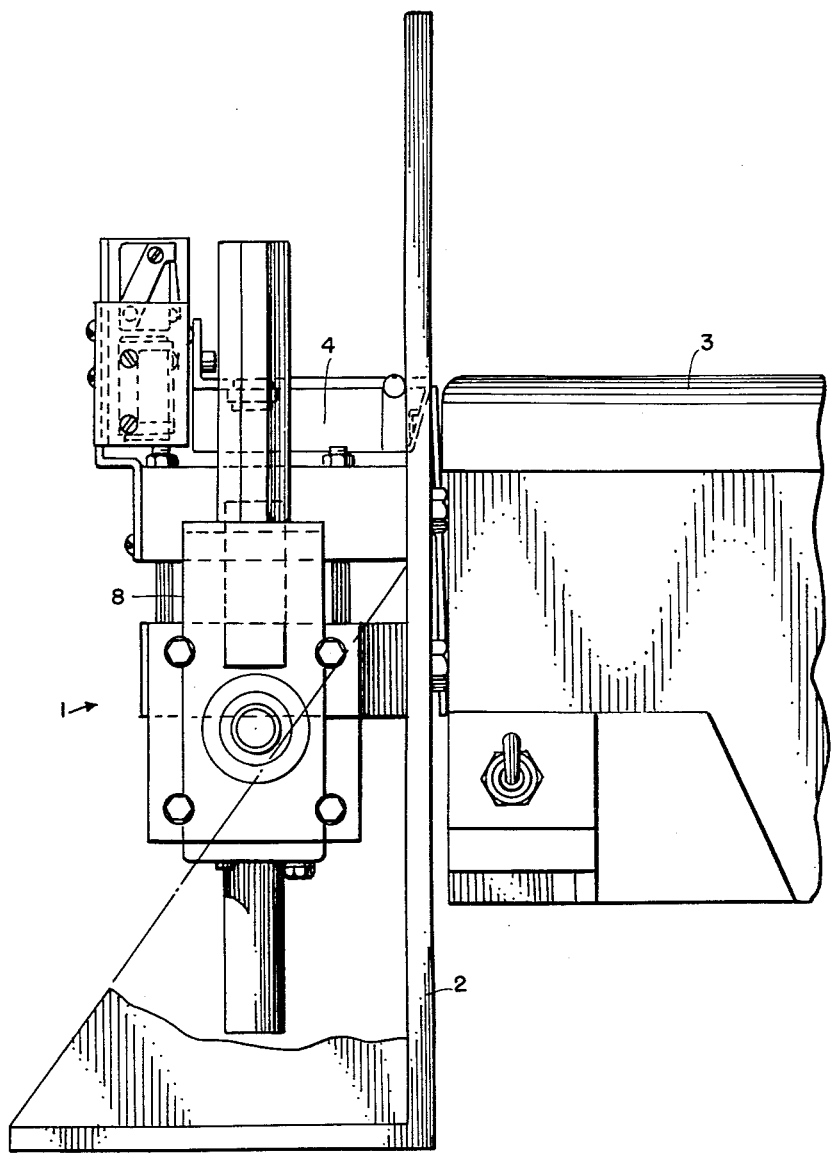

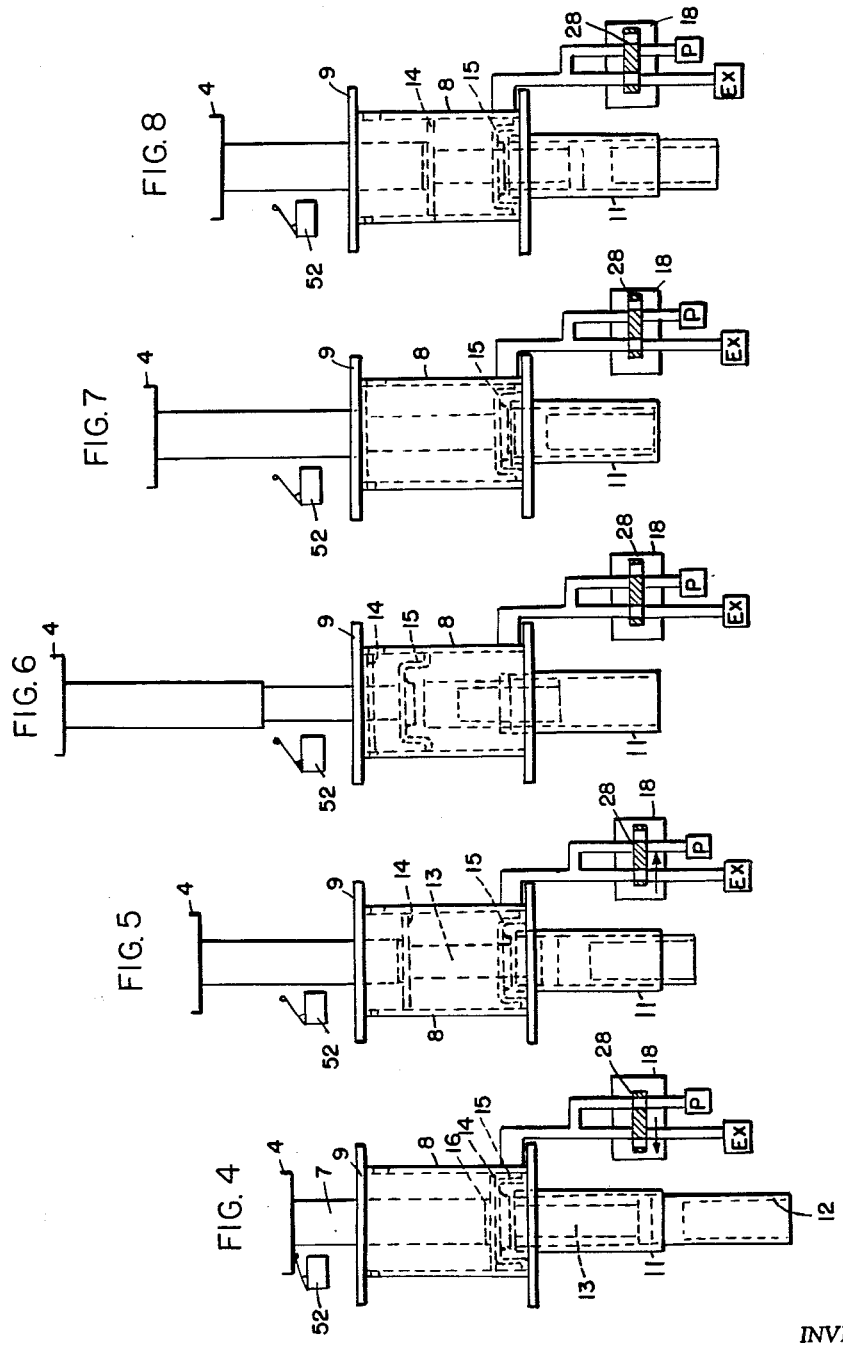

May 22, 1962 V. HECHLER IV, ET AL 3,035,550
FLUID MOTOR
Filed April 25, 1960 4 Sheets-Sheet 4

INVENTORS:
VALENTINE HECHLER, IV
JEROME WEINBERG
BY
ATT'Y

3,035,550
FLUID MOTOR
Valentine Hechler IV, Evanston, and Jerome Weinberg, Chicago, Ill., assignors to Webcor, Inc., Chicago, Ill., a corporation of Illinois
Filed Apr. 25, 1960, Ser. No. 24,320
1 Claim. (Cl. 121—38)

This invention relates generally to lifters, ejectors and dispensers and more particularly to a rapidly operating and rapidly asperating fluid motor of the piston type for dispensing articles which is fully automatic in operation.

The primary object of this invention is to provide a dispenser with an ejector motor operator which with a short stroke will impart a quick and driving thrust to the article being dispensed to move the article a considerable distance from the dispenser at high velocity.

A particular object of this invention is to provide a dispenser with a fluid motor ejector operator wherein the fluid motor is rendered fast acting in one direction of movement to impart a high velocity to an article being dispensed.

A further object of this invention is to provide a novel fluid motor actuator for dispensing or lifting equipment.

A still further object of this invention is to provide a novel, fully automatic fluid motor actuator for dispensing equipment which motor can operate through a complete cycle in response to receiving an article in the ejecting position.

Another object of the invention is to provide a quick acting piston in one direction which is decelerated with the same fluid under pressure with which it was accelerated and is also returned rapidly in the opposite direction and also decelerated in the opposite direction with the same fluid under pressure.

The invention is also characterized by a piston rod reciprocably mounted for limited movement in sliding relationship with separately actuated piston heads which receive working fluid under pressure between them.

Another object of this invention is to provide a piston type fluid motor, whose inertia is braked with the working fluid which initiated it, wherein the piston rod is caused to travel rapidly in one direction by working fluid under pressure to dispense an article at a high rate of speed and to brake and return the rod to resting position by the same fluid, said fluid cushioning the piston rod at the end of both strokes.

A further object of this invention is to provide a novel fluid motor actuator of the piston type with inherent mechanism to prevent damage to the piston when moved in rapid traverse in one direction within the confines of the cylinder housing of the actuator.

Another object of the invention is to provide an improved piston drive whose drive is accelerated the full distance of the piston movement in a direction opposite to that in which it is normally urged without any braking thereof during said piston movement.

Another object of this invention is to provide a novel control system for a fluid actuated motor for article dispensing apparatus.

Another object of the invention is to decelerate in direct relationship the acceleration of a piston.

With the foregoing and other objects in view, the invention resides in the following specification and appended claim certain embodiments and details of construction of which are illustrated in the accompanying drawings in which:

FIG. 3 is a view in side elevation of the equipment illustrated in FIG. 1;

FIGS. 4 through 8 are schematic views of the fluid motor actuator of this invention along with its control valve depicting the complete operating cycle of the equipment in sequential order;

Figure 1:
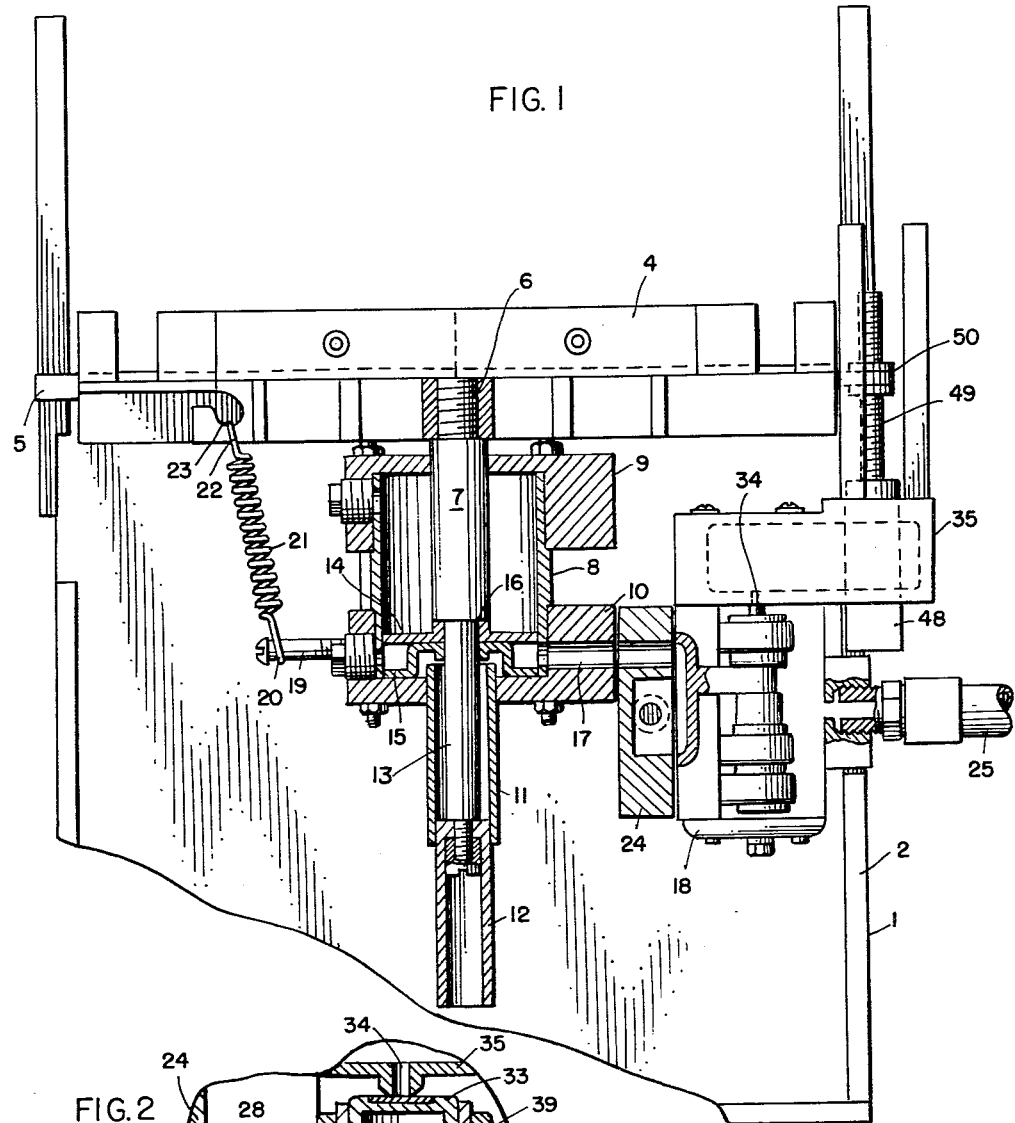
FIG. 1 is a partially sectioned view in front elevation of the invention illustrating particularly the actuator motor and the ejector carriage of the dispensing mechanism.

Referring now more particularly to the drawings, the ejecting mechanism generally indicated at 1, includes a frame 2 which may be secured by suitable means (not shown) to an article feed mechanism 3 of a dispensing machine. In general, this dispensing machine automatically delivers articles to be dispensed from the mechanism 3 to an ejector carriage 4 at the upper end of ejecting mechanism 1.

The ejector carriage 4 comprises a tray-like member which may be designed to accommodate articles of different shapes and sizes. This particular mechanism was designed for handling rectangular packages of uniform length. The carriage 4 is provided with a guide element 5 (FIG. 1) at one end thereof which rides in a guideway (not shown) of the ejecting mechanism 1. The other end of the carriage is guided by mechanism to be described which rides in an associated portion of the apparatus.

The carriage 4 is secured as by a threaded coupling 6 to the upper end of a piston rod 7. The rod 7 extends upwardly and outwardly from a pressure fluid receiving cylinder 8. Cylinder 8 is provided with upper and lower cap members 9 and 10 respectively, which complete the cylinder assembly. Both caps having central openings slidably receiving the piston and the lower cap member 10 preferably is provided with an integrally connected depending tubular guide 11. The rod 7 extends downwardly into this extension and is attached at its lower extremity to a concentric guide member 12 which slides freely within extension 11 when the rod 7 is reciprocated. Thus, the carriage 4 is carried on rod 7 and is seen to be stabilized in movement by suitable guide means for the carriage itself and by guide means for the piston rod.

The piston rod 7 within cylinder 8 is formed with a reduced diameter portion 13 upon which are slidably mounted a pair of individual pistons 14 and 15. As illustrated in FIG. 1 the piston 14 is at the terminus of the reduced diameter portion 13 of rod 7 and is engaging the shoulder 16 of the larger diameter portion of rod 7. The cap 10 is provided with a port 17 which connects the cylinder 8 through a control valve mechanism 18 and to a source of fluid under pressure in a manner to be later described. Secured to the cylinder cap 10 is a bolt 19 about which is connected the end 20 of a spring 21. The other end 22 of spring 21 is connected by suitable means to carriage 4 at lug 23. The spring 21 functions as a return spring for the carriage as will be later described.

Figure 2:
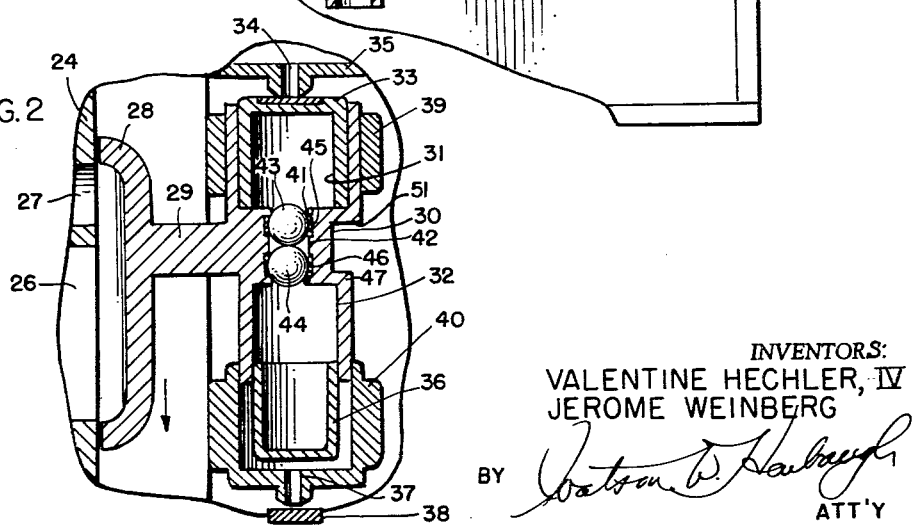
FIG. 2 is an expanded, sectioned view of the control valve mechanism for the actuator motor of FIG. 1.

As stated above admission and exhaust of motive fluid to and from the cylinder 8 is controlled by valve mechanism 18. The mechanism 18 includes a hollow body 24 to which is connected a fluid line 25 leading to a source of fluid pressure. Thus, the interior of the body is maintained at whatever pressure level exists in line 25. The body member is provided with an exhaust port 26 and a port 27 aligned with cylinder port 17. As illustrated in FIGS. 1 and 2, the ports 26 and 27 are opened to each other by a slide valve 28. This is the normal position of the valve 28 when the cylinder and piston assembly is dormant. The valve 28 includes an integral arm 29 which is in turn integral with a spool piston 30 having upper and lower piston members 31 and 32 respectively. Within upper piston member 31 is a free piston 33 which seats against a port 34 of a chamber 35 which is normally open to atmospheric pressure. Within the lower piston member 32 is a second free piston 36 which normally seats against a port 37 leading to atmosphere but which is blocked by a valve element 38 of a solenoid. The spool or pilot piston 30 is suitably supported within body 24 by cylinders 39 and 40. Centrally of the spool 30 is a passage 41 in which is mounted a normally centered check valve 42 including a pair of connected balls 43 and 44. The balls 43 and 44 are centered by and are normally held off their seats by springs 45 and 46 so that pressure between the two sections of the spool valve may equalize.

The operation of the control valve mechanism is initiated by energizing the solenoid (to be later described) which acts to move seating element 38 away from port 37. The pressure beneath lower spool piston 32 drops towards atmospheric pressure and the pressure within the body area 47 and on the top of free piston 33 acts to force the spool 30 downwardly carrying valve 28 along with it and opening port 27 to full pressure. In practice, the port 27 is only opened long enough to account for one rapid cycle of the pistons 14 and 15. Almost immediately after opening port 37, the solenoid again closes the same. As the free piston 33 moves downwardly it uncovers port 34 or chamber 35. Chamber 35 is periodically opened to atmosphere by a slide valve 48 in that each time the carriage 4 is raised to an upper position the valve head 48 goes with it and uncorks the chamber 35 at the upper portion of the excursion of the carriage. In order to accomplish this the valve 48 is provided with a threaded stem 49 which is secured to carriage 4 by a threaded joint 50. By adjusting the vertical position of valve 48 relative to carriage 4 the time of venting chamber 35 to atmosphere may be varied. The piston 33 opens port 34 at the same time that air pressure is delivered to cylinder 8, and the vent port valve 48 to atmosphere from chamber 35 is closed as the carriage 4 moves upwardly. Therefore, the pressure in chamber 35 will tend to equalize with the pressure in the valve body. For downward movement of the carriage 4 the valve 48 will have opened chamber 35 to atmosphere causing a pressure drop therein. Simultaneously then, with the closing of port 37 by solenoid valve element 38 and the pressure drop in chamber 35, pilot valve 30 will operate reversely to move upwardly to again seal off port 34 and port 27 to the cylinder 8. The pressure drop is effective on shoulder 51 of valve 30 to move the same upwardly. Any unequal pressures occuring within the free pistons 33 and 36 are equalized through the passage 41.

In brief summary then, it is apparent that the control valve 18 is normally in the position indicated in FIG. 2 with the cylinder 14 being open to exhaust port 26 through slide valve 28. Upon an impulse from a solenoid operator a pressure drop is caused below the pilot valve 30 causing the valve to move downwardly to open the port 27 to full line pressure. The solenoid means then removes the vent to atmosphere by closing port 37 and the pressure immediately tends to equalize. Meanwhile, the means described creates a similar type pressure drop at the piston 33 between body and chamber 35 so that the valve 30 is moved rapidly upward to carry slide valve 38 back to its normal position venting port 27 to exhaust 26.

While the control valve is in either its normal or operating position, the piston rod 7 with its pistons 14 and 15 is undergoing a cycle of operation as illustrated in FIGS. 4 through 8. In FIG. 4 the slide valve 28 of control valve 18 has just been opened and the piston rod 7 has not yet moved upwardly. In this position the carriage 4 is in its full retracted position and is engaged against a switch 52. Switch 52 is in circuit with the solenoid, and in the closed circuit position, as when engaged by carriage 4, conditions the solenoid for operation as will be later described. Now with valve 28 as shown, pressure fluid from source P is directed into cylinder 8 between pistons 14 and 15. Piston 14 engaged against shoulder 16 of rod 7 will quickly move the rod 7 upwardly with great and continuing acceleration. FIG. 5 illustrates the same mechanism as FIG. 4 with the rod 7 approximately one-half way upward in its travel. The switch 52 has been opened by carriage 4 moving from engagement therewith. The guide member 12 has moved upwardly in extension 11 of cap 10 to a position just short of engagement with piston 15. The piston 14 continues its upward drive until it engages the cap 9. Meanwhile, the slide valve 28 has been closed so that the cylinder 8 is connected to the exhaust side of control valve under controlled exhaust condition.

The inertia of the upward thrust of piston 14 and carrier 4 carries the piston rod 7 upwardly away from the piston 14. In the excursion of the piston rod 7 between the positions of FIGS. 5 and 6, the upper end of guide member 12 however, engages piston 15 and carries it upwardly to recompress the volume of fluid under pressure between the pistons 15 and 14. The build-up of pressure between the two pistons aids in stopping the upward movement of rod 7 without any hammer of heavy moving parts. Almost immediately, with cylinder 8 open to exhaust through valve 28 below the piston 15 this pressure build-up between pistons 14 and 15 will operate to force piston 15 and the rod 7 downwardly as indicated in FIG. 7 since the piston 14 is held against the cap 9.

In FIG. 7, the piston 15 has descended as far as it can go, but a reverse inertia has been imparted to rod 7 which together with spring 21 and gravity will move the rod 7 and carriage 4 ultimately back to the position of FIG. 4. In this return to the position of FIG. 4 the shoulder 16 of rod 7 re-engages piston 14 as illustrated in FIG. 8 pushing it downwardly toward its original position. Thereafter, the exhaust relation serves as a dash pot to cushion the return of the parts to their resting position.

Suitable relief valves (not shown) may be utilized with the pistons 14 and 15 and cylinder 8 action to assist in regulating the rate of travel of the rod 7 in either or both directions.

When carriage 4 is returned to the position of FIG. 4 switch 52 is engaged to recondition the solenoid circuit for another cycle of operation.

Figure 9:
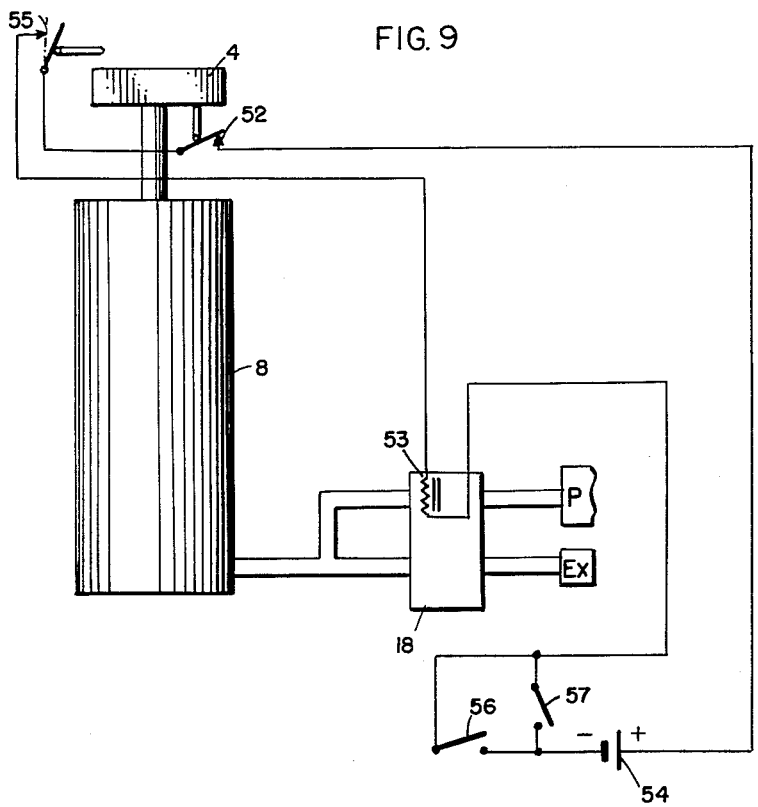
FIG. 9 is a schematic circuit diagram illustrating the electrical control system for the actuator of this invention.

The electrical system is illustrated schematically in FIG. 9. A solenoid operator 53 is illustrated as being associated with control valve 18. The operator 53 is connected between ground and switch 52. Thus any time that carriage 4 engages switch 52 the solenoid operator 53 is in condition to function. Switch 52 is also connected to a source of power 54 and the connections thereto include an on-off switch 56 and a set switch 57 for automatic operation when closed to shunt switch 56. The switch 52 is normally positioned as illustrated in dotted lines adjacent the carriage 4 in its retracted position. An article from the feed mechanism 3 when moved on to carriage 4 engages switch 55 to close the circuit from power source 54 through solenoid operator 53. It is thus apparent that the system will initiate operation only when the carriage 4 is retracted against switch 52 and only when the switch 55 is closed by an article on the carriage if the set switch 57 is closed. When both conditions are satisfied and the set switch 57 is closed the solenoid operator 53 will operate valve 18 automatically when a package is on the carriage and the rod 7 with carriage 4 will be thrust upwardly with great acceleration. Since upward movement of carriage 4 disengages the switch 52 it becomes apparent that solenoid operator 53 becomes de-energized and valve 28 under the control of pilot valve 30 will function as described above to cut off the supply of air under pressure to cylinder 8. If the set switch 57 is open, then the actuation of the piston rod 7 is timed in relation to the operation of the switch 56.

Figure 10:
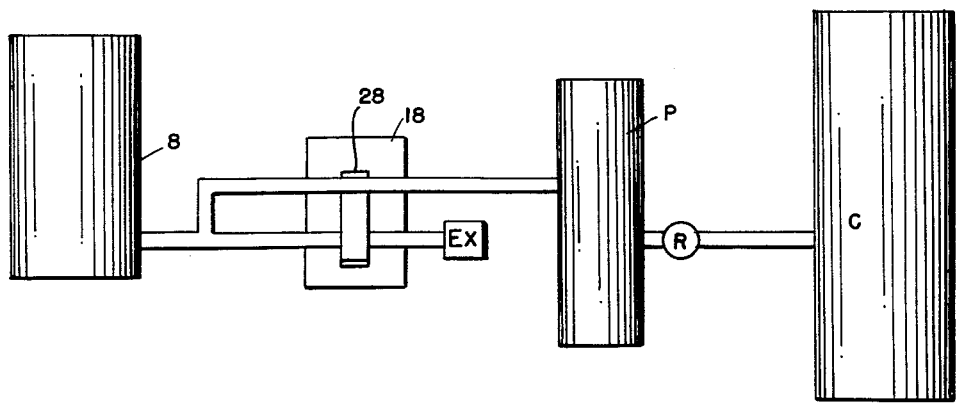
FIG. 10 is a schematic view of the fluid pressure system for the actuator of this invention.

FIG. 10 is a schematic layout of the pressure fluid system and illustrates the cylinder 8 connected through valve 18 to supply pressure tank P and to an exhaust tank Ex which is at atmospheric pressure. A compressor C supplies pressurized air through a regulator R to tank P.

A summary of the operation of the entire system is as follows:

(1) An article to be dispensed is delivered from feed mechanism 3 to carriage 4;

(2) The article engages switch 55 which conditions the electrical system for operation;

(3) The solenoid operator sets pilot valve 30 in operation to open main slide valve 28 admitting pressure fluid to cylinder 8;

(4) Piston 14 moves upwardly carrying the rod 7 and carriage 4 with it;

(5) In its upward travel rod 7 picks up piston 15 which generates a compressed air force between itself and piston 14 as the upper limit of travel is reached;

(6) The created compressed air force moves first the piston 15 and rod 7 downwardly in cylinder 8;

(7) The rod 7 in its downward movement picks up piston 14 and the carriage and piston assembly is moved back to its original position with the aid of a swing 21 and gravity; and (8) Upon reaching the retracted position the carriage 4 engages switch 52 to condition the circuit of solenoid operator 53 but another cycle of operation will not occur until switch 55 is closed by another article being placed on the carriage 4 for ejection.

It is thus seen that the invention provides a fully automatic or a timed ejecting system for a dispensing mechanism wherein a fluid motor is controlled in such a manner as to permit an ejection of an article from the mechanism with great acceleration and at rapid repeat intervals without harm to the system. It is realized that the equipment illustrated may be subject to various modifications well within the skill of these inventors who intend to be limited only to a reasonable interpretation of the scope of the appended claim.

What is claimed is:

A fluid motor for use with dispensing equipment comprising a cylinder, a piston rod mounted concentrically of the cylinder and extending outwardly of either end thereof, said rod having a section of reduced diameter between two sections of larger diameter, a pair of free pistons slidably mounted on the reduced diameter portion of the piston rod, and port means to admit pressure fluid to the cylinder between the pistons, one of said pistons being active to move the rod in one direction relative to the cylinder and the other of said pistons being moved by the engagement with an enlarged portion of the rod and by momentum of the rod to a position where such a compression of fluid is created betweeen the two pistons as to cause a reverse movement of the rod within the cylinder.

References Cited in the file of this patent
UNITED STATES PATENTS

| | | |
|---|---|---|
| 512,790 | Bachman | Jan. 16, 1894 |
| 2,664,860 | Levetus | Jan. 5, 1954 |
| 2,809,624 | Becher et al. | Oct. 15, 1957 |
| 2,820,434 | Otto | Jan. 21, 1958 |
| 2,886,025 | Amistadi | May 12, 1959 |